United States Patent
Hossain et al.

(10) Patent No.: US 6,820,109 B2
(45) Date of Patent: *Nov. 16, 2004

(54) SYSTEM AND METHOD FOR PREDICTIVE COMPARATOR FOLLOWING ADDITION

(75) Inventors: Razak Hossain, San Diego, CA (US); Lun Bin Huang, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 557 days.

This patent is subject to a terminal disclaimer.

(21) Appl. No.: 09/948,360

(22) Filed: Sep. 7, 2001

(65) Prior Publication Data

US 2003/0050951 A1 Mar. 13, 2003

(51) Int. Cl.⁷ .................................................. G06F 7/50
(52) U.S. Cl. ....................................... 708/671; 708/709
(58) Field of Search ................................ 708/671, 706, 708/708, 709

(56) References Cited

U.S. PATENT DOCUMENTS 5,144,577 A * 9/1992 Linnenberg ................. 708/671
5,923,579 A * 7/1999 Widigen et al. ............. 708/706
6,292,818 B1 * 9/2001 Winters ...................... 708/671
6,466,960 B1 * 10/2002 Winters ...................... 708/671

* cited by examiner

Primary Examiner—Chuong Dinh Ngo
(74) Attorney, Agent, or Firm—Lisa K. Jorgenson; Stephen C. Bongini

(57) ABSTRACT

A computing system includes a plurality of full adders that each receives a bit-wise inversion of a bit of a first data, a bit of a second data, and a bit of a third data, respectively, and provides a sum output and a carry output. An exclusive-OR logic module receives the sum output of a first of the plurality of full adders and a carry output of a second of the plurality of full adders and provides an exclusive-OR output. An AND logic module has a plurality of inputs and an AND output, wherein the exclusive-OR output is electrically connected to one of the plurality of inputs of the AND logic module, and the AND output provides a signal that indicates whether the first data equals the sum of the second data and third data.

19 Claims, 4 Drawing Sheets

```
module pred_orig (
    input_x,  // Input bus x
    input_y,  // Input bus y
    input_z,  // Input bus z
    equal     // Output equal
);

input [31:0] input_x;
input [31:0] input_y;
input [31:0] input_z;
output equal;

reg [31:0] add;
reg equal;

always @ (input_x or input_y or input_z)
    begin
        add = input_x + input_y;
        if (add == input_z)
            equal = 1;
        else
            equal = 0;
    end
endmodule
```

FIG. 3

```
module pred_new (
    input_x,  // Input bus x
    input_y,  // Input bus y
    input_z,  // Input bus z
    equal     // Output equal
);

input [31:0] input_x;
input [31:0] input_y;
input [31:0] input_z;
output equal;

reg [31:0] sum;
reg [31:0] carry;
reg equal;

always @ (input_x or input_y or input_z)
    begin
        sum = input_x ^ input_y ^ ~input_z;
        carry = (input_x & input_y)|(input_x & ~input_z)|
                (input_y & ~input_z) ;
        equal = & (sum ^ {carry [30:0] , 1'b0}) ;
    end
endmodule
```

FIG. 4

SYSTEM AND METHOD FOR PREDICTIVE COMPARATOR FOLLOWING ADDITION

BACKGROUND OF THE INVENTION

1. Field of the Invention

This invention relates in general to logic circuits and computing systems, and more particularly to a device and method for a predictive comparator following addition.

2. Description of the Prior Art

Modern computing systems frequently are required to perform a rapid comparison following an addition. Some examples include in Arithmetic Logic Units (ALUs) where the output of an addition is often tested to see if it is equal to zero or if it equals to some number. See for example the circuit 100 illustrated in FIG. 1. The 32 bit register values X 102 and Y 104 are added by the adder 106 using a conventional carry propagate addition. The result 108 of the carry propagate addition is compared to the 32-bit register value Z 112 by the comparator 110 to determine if the result 108 equals the value of register Z 112. The output 114 of the comparator 110 indicates whether the two values are equal to each other. An example simulation of the circuit of FIG. 1, using a Verilog model, is shown in FIG. 3.

Furthermore, fast branch instructions in a high speed computing architecture provide a fast test if arithmetic logic unit addition equals zero (e.g., branch on zero) or if it equals a particular number (e.g., branch if reached a particular number value). The faster these instructions are performed the faster the overall computing system is capable of handling CPU intensive operations. The overall computing speed of a high speed computing system, in certain applications, may be significantly limited by how quickly the system can perform compare instructions following addition instructions.

Additionally, a key technique for improving the performance of a microprocessor, or in general any stored program machine, involves guessing the direction that a jump instruction takes, i.e., if the jump is taken or not taken. This is particularly important for pipelined computer architectures. These computing systems typically utilize fast compares following additions to predict branch addresses for jump instructions in a pipeline.

As is well understood by those of ordinary skill in the art, jump instructions constitute a significant portion, e.g., approximately 20%, of all executed instructions for a processor. If a jump instruction is taken, a processor must execute instructions from a new location in an instruction sequence. If the jump is not taken then the current flow of instructions continues.

A primary implementation technique used to achieve high clock rate in current processors is to deeply pipeline an architecture. This technique corresponds to breaking down the number of steps needed to execute an instruction into a large number of much smaller steps. Since these steps each perform a much smaller task than an unpipelined design, much higher clock rates become possible. The largest problem in such pipelined machines are the presence of jump instructions. If the jump is taken, and no attempt is made to predict it, then until the new instruction is available the pipeline must be frozen. This delay unfortunately decreases the performance of the stored program machine.

Generally a jump location, as is well known by those of ordinary skill in the art, is calculated by adding a number to the current instruction pointer. This is done with an adder. Subsequently, the result of the addition must be compared with the expected result. This comparison is provided by logic that allows the machine to guess the address of where the jump instruction will transfer the program counter to. If the two numbers are the same the jump has been correctly guessed, and the machine continues with its operation. Otherwise, the machine stalls and continues from the point of the jump instruction. The calculation involving a comparison, following an addition, is complex and often a critical path in the actual implementation of a design. Since the result of the operation determines the next task performed by the machine, it needs to be calculated quickly.

Accordingly, there exists a need for overcoming the disadvantages of the prior art as discussed above, and in particular to improve the processing speed of compare operations following addition operations in computing systems such as required for high speed and pipelined computing systems and for fast branch operations.

SUMMARY OF THE INVENTION

An approach to performing a fast comparison following an addition is proposed and demonstrated to show a significant reduction in delay as compared to a conventional implementation. Computer processing speed may increase by 45%. This is a significant improvement that enhances commercial viability of a fast computing system.

A preferred embodiment of the present invention does not require a carry propagate addition to be completed prior to a comparison being performed. The resultant new and novel solution has a smaller delay and requires less hardware than a conventional solution.

According to a preferred embodiment of the present invention, a full adder followed by XOR and AND logical operations replaces a conventional wide carry propagate addition followed by a compare operation. This improves computation speed by about 45%.

Fast branch instructions in high speed computing architecture, according to a preferred embodiment of the present invention, provide a fast test if an arithmetic logic unit addition equals zero (e.g., branch on zero), or if it equals a particular number (e.g., branch if reached a particular number value).

Pipelined computer architectures additionally benefit from fast compare following addition operations to predict branch addresses for jump instructions in the pipeline.

BRIEF DESCRIPTION OF THE DRAWING

Other advantages and features of the invention will become apparent on examining the following detailed description of the preferred embodiments and the accompanying drawings, in which:

FIG. 3 shows an exemplary Verilog model for the conventional circuit implementation illustrated in FIG. 1.

FIG. 4 shows an exemplary Verilog model for the circuit implementation illustrated in FIG. 2, in accordance with a preferred embodiment of the present invention.

DESCRIPTION OF THE PREFERRED EMBODIMENTS

Figure 1:
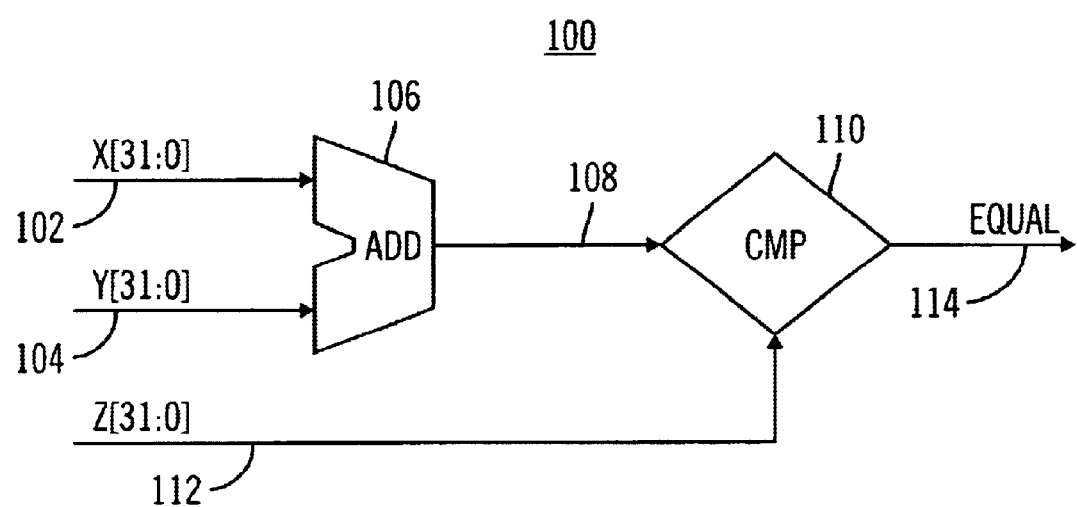
FIG. 1 is a circuit block diagram illustrating a conventional implementation of a compare following addition.

The present invention can reduce the cycle delay to perform a compare following addition by approximately 45% from prior art system implementations. This is a significant improvement for fast computing systems, as will be discussed in detail below.

Definitions for a Discussion Below 1) 32 'h0001 means a 32 bit number with the least significant bit having a value of one and all other bits having a zero value. This corresponds to Verilog notation.
2) 32 'hffff:A 32 bit number with all bits having a logic one value. CSA32 or Full Adder means an exemplary carry save adder circuit (32-bits wide) that adds three equally weighted numbers (32-bits wide) and gives the result as a sum and a carry. The carry has a weight of 2, while the sum has a weight of 1.
3) {A,B} means a concatenation of buses A and B, with bus A bits in the most significant position and bus B bits in the least significant position. This is adopted from the Verilog notation.
4) Verilog means a hardware description language that is well known by those of ordinary skill in the art.

A main problem solved by a preferred embodiment of the present invention relates to comparing the result of an addition with another number. The compare is done at least partially in parallel with the addition operation and allows for a significantly faster implementation than a conventional comparison following a conventional addition. A conventional addition typically includes a carry propagate addition operation.

Modern computing systems improve performance of a processor, or in general any stored program machine, by utilizing a deep pipeline in the computer system design. A major problem in such pipeline implementations is the presence of jump instructions. If a jump is taken, and no attempt is made to predict it, then until the new instruction is available the pipeline must be frozen. It is obvious that being able to predict the direction of a jump with a high degree of accuracy will significantly improve performance by allowing the stored program machine to guess if instructions from a new location need to be read, and to read these instructions sufficiently early into the pipeline to ensure that the flow of instructions is only minimally stalled.

A preferred embodiment of the present invention aids in the logic associated with calculating the location of a jump. Generally the jump location is calculated by adding a number to the current instruction pointer. This is done with an adder. Subsequently, the result of the addition must be compared with the expected result. This is provided by logic which allows the stored program machine to guess where the jump will occur to. If the two numbers are the same the jump has been correctly guessed, and the machine continues with its operation. Otherwise, the machine stalls and continues from the point of the jump instruction. The calculation involving a comparison, following an addition, is complex and often a critical path in the actual implementation of the design. Since the result of the operation determines the next task performed by the stored program machine, it needs to be calculated quickly.

Additionally, in fast computing systems, frequently a comparison following an addition is required. Examples include arithmetic logic units (ALUs) where the output often has to be tested to see if it is equal to zero. By increasing the speed of operation of such comparisons following additions the overall speed and performance of the computing system will be significantly increased.

Overview of Exemplary Process for Fast Compare Following Addition

Algebraically a typical process is as follows: add two integers X and Y and check to see if the result of this addition is equal to an integer Z. In general, X, Y, and Z, are not equal to zero, although if they are, the implementation can be further optimized. For this example the integers X, Y, and Z, are assumed to be 32 bit numbers. The result trivially extends to different input width lengths, as is well known to those of ordinary skill in the art.

Thus, an algebraic verification of the process follows.

We are given the equation X+Y=Z.

X+Y−Z=0 (Follows from the additive inverse in Boolean Algebra)

X+Y+∼(Z)+32 'h0001=32 'h0000 (Follows from the definition of the Binary inverse)

X+Y+∼(Z)=32 'h0000−32 'h0001

X+Y+∼(Z)=32 'h0000+32hffff=32 'hffff

A problem statement can hence be formulated as being equivalent to determining if the sum of three numbers is equal to a value of all one's. With the use of an array of full adders, i.e., carry save adder 32*s* (CSA 32*s*), it is possible to compress the three numbers X, Y, and ∼(Z), into a sum, S, and a carry, C. The working mechanism of a full adder is well known to those of ordinary skill in the art and is not repeated here. The resultant sum, S, bus and carry, C, bus are each 32 bits long, with the carry bus, C, shifted one position to the left. For the final result, R, we add these two buses, i.e., R[31:0]={C[30:0], 1 'b0}+S[31:0].

It is possible to show that for a result R=32 'hffff, each column of S[i] and C[i−1] added to form R[i] has to have exactly one logic one value, i.e., S[0]=1 and S[i] XOR C[i−1]=1, where, i is in the set of numbers 1 thru 31, and XOR defines the Boolean exclusive OR operation. A proof follows.

The condition that if S[0]=1 and S[i] XOR C[i−1]=1, where i is in the set of (1,31), that the result R equals all ones directly follows from the definition of R[31:0] as equal to {C[30:0], 1 'b0}+S[31:0]. The condition can be proved by assuming the negation that S[j] XOR C[j−1]=0, for some j in the set of (1,31), or, S[0]=0. In the first case, for R[j] to be equal to 1 the carry-in for the j-th column would have to be 1. Now for the j-th carry-in to be 1, the carry-out of the (j−1)-th column would have to be 1. Since R(j−1) is required to be 1 and the carry-out of the (j−1)-th column also must be 1, the carry-in for the (j−1)-th column must also be 1. This corresponds to the carry-out of the (j−2)-th column being 1.

Recursively applying this principle implies that the carry-in for the 0-th bit would have to be 1. This is, however, not possible, as the addition does not have a carry-in bit, proving that if S[j] XOR C[j−1]=0 for some j in the set of (1,31) the output bus can not be all ones. The proof that if S[0]=0 that R(0) not equal to 1 follows from the tautologically obvious point that R(0)=S(0).

A hardware implementation 200 of a comparator following an adder, according to a preferred embodiment of the present invention, can be performed by a plurality of full adders 208, 228, 248, (operating on the input X 202, 222, 242, input Y, 204, 224, 244, and input ∼(Z ) 206, 226, 246, buses). The word format, in this example, is illustrated using 32 bits for the each of the data inputs. It should be obvious to those of ordinary skill in the art, in view of the present discussion, that more or less than 32 bit word format can be likewise desirable according to particular implementation requirements. As computing systems increase in data processing requirements, for example, the size of data buses can increase accordingly to much more than 32 bit word format.

Each full adder 208, 228, 248, includes a sum output bus 212, 232, 252, and a carry output bus 210, 230, 250, as shown. The sum out bus 212, 232, 252, and the carry output bus 210, 230, 250, are electrically coupled to exclusive OR operation 260, as shown. An AND tree operation 268 operates on the results 262, 264, 266 of the exclusive ORs 260. Note that some of the higher and lower exclusive ORs, that are following the higher full adder 208 and the lower full adder 248 in this example, are not shown in FIG. 2. A logic output 270 of 1 would indicate if the result of the adder equaled the number being compared to. Other alternative equivalent operational arrangements, in accordance with the present invention, should become obvious to those of ordinary skill in the art in view of the present discussion. For example, following the full adder array 208, 228, 248, an exclusive NOR operation (not shown) and a bus wide NOR tree (not shown) could also provide the same result. An exemplary simulation of the circuit implementation of FIG. 2, using a Verilog model, is shown in FIG. 4.

Advantages Over Prior Art

Advantages of a preferred embodiment implementation technique over a conventional implementation include the greatly reduced time required to perform the full comparison. A comparator requires an exclusive OR array to be followed by an AND tree. A preferred embodiment in accordance with the present invention also utilizes this hardware (or its equivalent implementation using exclusive NOR gates and a NOR tree). However, the wide carry propagate addition needed in the conventional implementation is replaced in this case with a much faster full adder implementation. This corresponds to a significant delay savings. Additionally, reduced circuitry will be used. Therefore, both a faster performance and a simpler circuit (lower cost) implementation is provided by a preferred embodiment of the present invention.

Figure 2:
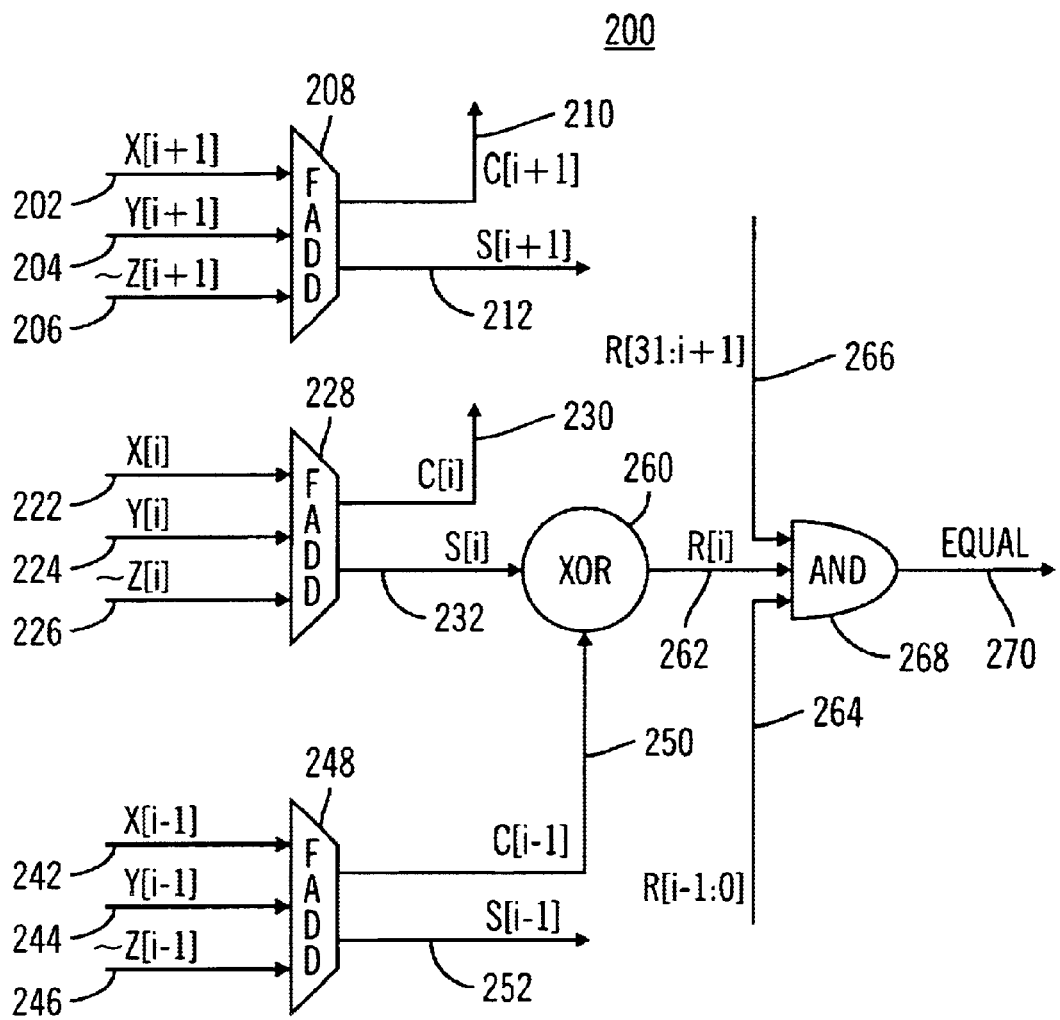
FIG. 2 is a circuit block diagram illustrating a compare following addition circuit implementation according to a preferred embodiment of the present invention.

In order to demonstrate the savings achievable by the new approach, implementations based on the conventional implementation, as shown in FIG. 1, and based on the new and novel implementation according to a preferred embodiment of the present invention, as shown in FIG. 2, were synthesized in a 0.18 $\mu$m CMOS library using Verilog models. The Verilog models of the two implementations are shown in FIGS. 3 and 4. Synthesis results show that the conventional implementation required 2.25 nS, while the exemplary new and novel implementation required 1.27 nS. This corresponds to approximately a 44% reduction in processing delay.

A new and novel implementation to performing a comparison following an addition has been demonstrated to show a significant reduction in delay compared to a conventional implementation. The new and novel implementation does not require a carry propagate addition to be completed prior to the comparison being performed. Further, in accordance with a preferred embodiment of the present invention, an overall circuit is simpler and less expensive to manufacture. These advantages significantly enhance the commercial viability of any computing system implementation utilizing a preferred embodiment according to the present invention. This is especially beneficial for high speed computing systems and for pipelined architectures.

While there has been illustrated and described what are presently considered to be the preferred embodiments of the present invention, it will be understood by those of ordinary skill in the art that various other modifications may be made, and equivalents may be substituted, without departing from the true scope of the present invention.

Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A computing system comprising:
  a plurality of full adders, wherein each of the plurality of full adders comprising three inputs for receiving a bit-wise inversion of a portion of a first data, a portion of a second data, and a portion of a third data, respectively, and
  wherein each of the plurality of full adders adding its respective bit-wise inversion of a portion of the first data, portion of the second data, and portion of the third data, to provide a sum data at a sum output and a carry data at a carry output; and
  the sum output of a first of the plurality of full adders being electrically coupled to a first input and the carry output of a second of the plurality of full adders being electrically coupled to a second input of one of:
    1) an exclusive-OR logic module having an output electrically coupled to an AND logic module that has an equal output, and
    2) an exclusive-NOR logic module having an output electrically coupled to a NOR logic module that has an equal output, and wherein the equal output providing a signal that indicates whether the first data equals the sum of the second data and third data.

2. The computing system of claim 1, wherein the three inputs of each of the plurality of full adders are electrically coupled to a bit of a first data, a bit of a second data, and a bit of a third data, respectively, and wherein the plurality of full adders constitutes a full adder operation of: 1) a bit-wise inversion of the first data, 2) the second data, and 3) the third data.

3. The computing system of claim 1, wherein the plurality of full adders constitutes a fast compare following addition operation, where the first data is compared to the addition of the second data and the third data, and wherein the equal output provides the signal that indicates whether the first data equals the sum of the second data and third data.

4. The computing system of claim 1, wherein the plurality of full adders constitutes a fast compare following addition operation to predict branch addresses for jump instructions.

5. The computing system of claim 4, wherein the fast compare following addition operation predicts branch addresses for jump instructions in a pipeline architecture.

6. An integrated circuit comprising:
  a fast compare following addition operation module comprising:
    a plurality of full adders, wherein each of the plurality of full adders comprising three inputs for receiving a bit-wise inversion of a portion of a first data, a portion of a second data, and a portion of a third data, respectively, and
    wherein each of the plurality of full adders adding its respective bit-wise inversion of a portion of the first data, portion of the second data, and portion of the third data, to provide a sum data at a sum output and a carry data at a carry output; and
    the sum output of a first of the plurality of full adders being electrically coupled to a first input and the carry output of a second of the plurality of full adders being electrically coupled to a second input of one of:
      1) an exclusive-OR logic module having an output electrically coupled to an AND logic module that has an equal output, and 2) an exclusive-NOR logic module having an output electrically coupled to a NOR logic module that has an equal output, and wherein the equal output providing a signal that indicates whether the first data equals the sum of the second data and third data.

7. The integrated circuit of claim 6, wherein the three inputs of each of the plurality of full adders are electrically coupled to a bit of a first data, a bit of a second data, and a bit of a third data, respectively, and wherein the plurality of full adders constitutes a full adder operation of: 1) a bit-wise inversion of the first data, 2) the second data, and 3) the third data.

8. The integrated circuit of claim 6, wherein the plurality of full adders constitutes a fast compare following addition operation, where the first data is compared to the addition of the second data and the third data, and wherein the equal output provides the signal that indicates whether the first data equals the sum of the second data and third data.

9. The integrated circuit of claim 6, wherein the plurality of full adders constitutes a fast compare following addition operation to predict branch addresses for jump instructions.

10. The integrated circuit of claim 9, wherein the fast compare following addition operation predicts branch addresses for jump instructions in a pipeline architecture.

11. An electrical circuit comprising:
   a plurality of full adders, wherein each of the plurality of full adders comprising three inputs for receiving a bit-wise inversion of a bit of a first data, a bit of a second data, and a bit of a third data, respectively, for providing a sum output and a carry output;
   an exclusive-OR logic module having a first and second input, and an exclusive-OR output, wherein the sum output of a first of the plurality of full adders being electrically coupled to the first input of the exclusive-OR logic module, and wherein the carry output of a second of the plurality of full adders being electrically coupled to the second input of the exclusive-OR logic module; and
   an AND logic module having a plurality of inputs and an AND output, wherein the exclusive-OR output being electrically coupled to one of the plurality of inputs of the AND logic module, and wherein the AND output provides a signal that indicates whether the first data equals the sum of the second data and third data.

12. The electrical circuit of claim 11, wherein the electrical circuit comprises an arithmetic and logic unit.

13. The electrical circuit of claim 11, wherein the electrical circuit comprises a fast compare following addition circuit to predict branch addresses for jump instructions.

14. The electrical circuit of claim 13, wherein the fast compare following addition circuit predicts branch addresses for jump instructions in a pipeline architecture.

15. The electrical circuit of claim 11, wherein the plurality of full adders comprises a full adder for each bit of a word for the first data, each bit of a word for the second data, and each bit of a word for the third data.

16. The electrical circuit of claim 15, wherein the word format for the first data, the second data, and the third data, respectively, comprises at least 32 bits.

17. A method in a computing system comprising the steps of:
   carry-save-adding a bit-wise inversion of a first bit of a first data word, a first bit of a second data word, and a first bit of a third data word, and providing therefrom a first sum output and a first carry output;
   carry-save-adding a bit-wise inversion of a second bit of the first data word, a second bit of the second data word, and a second bit of the third data word, and providing therefrom a second sum output and a second carry output;
   exclusive-ORing the second sum output with the first carry output and providing a result output; and
   ANDing the result output to provide an AND output signal that indicates whether at least a portion of the first data word equals the sum of at least a portion of the second data word and at least a portion of the third data word.

18. The method of claim 17, wherein the carry-save-adding operation is repeated for each bit of the first data word, the second data word, and the third data word.

19. The method of claim 18 wherein each carry-save-adding operation provides a sum output and a carry output, and further comprising the steps of:
   exclusive-ORing each sum output corresponding to a bit of the first data word, the second data word, and the third data word, with a carry output corresponding to a previous bit of the first data word, the second data word, and the third data word; and
   ANDing the result output of all the exclusive-ORing operations to provide a collective AND output signal that indicates whether the first data word equals the sum of the second data word and the third data word.

* * * * *